(12) United States Patent
Yang et al.

(10) Patent No.: US 12,549,098 B2
(45) Date of Patent: Feb. 10, 2026

(54) SWITCHED CAPACITOR POWER CONVERTER CIRCUITRY OPERABLE IN FIRST AND SECOND MODES

(71) Applicant: Cirrus Logic International Semiconductor Ltd., Edinburgh (GB)

(72) Inventors: Seunguk Yang, Gyeonggi-do (KR); Juyeong Kim, Seoul (KR); InKuk Baek, Seoul (KR); SeHyung Jeon, Seoul (KR)

(73) Assignee: Cirrus Logic Inc., Austin, TX (US)

( * ) Notice: Subject to any disclaimer, the term of this patent is extended or adjusted under 35 U.S.C. 154(b) by 416 days.

(21) Appl. No.: 18/094,126

(22) Filed: Jan. 6, 2023

(65) Prior Publication Data

US 2024/0235388 A1 Jul. 11, 2024

(51) Int. Cl.
*H02M 3/07* (2006.01)
*H02M 1/32* (2007.01)
*H02M 1/00* (2006.01)
*H02M 1/15* (2006.01)

(52) U.S. Cl.
CPC ............ *H02M 3/07* (2013.01); *H02M 1/32* (2013.01); *H02M 3/072* (2021.05); *H02J 2207/20* (2020.01); *H02M 1/0025* (2021.05); *H02M 1/15* (2013.01)

(58) Field of Classification Search
CPC .......... H02M 3/07; H02M 3/072; H02M 1/32; H02M 1/0025; H02M 1/15; H02J 2207/20
See application file for complete search history.

(56) References Cited

U.S. PATENT DOCUMENTS

| 7,764,526 | B1* | 7/2010 | Xing ................ | H02M 3/07 363/60 |
| 10,554,124 | B1* | 2/2020 | Mangudi ............ | H02M 3/07 |
| 2018/0076635 | A1* | 3/2018 | Maalouf ............ | H02M 3/07 |
| 2020/0266708 | A1* | 8/2020 | Mahmoudidaryan ... | H02M 3/07 |
| 2021/0067033 | A1* | 3/2021 | Jing ................. | H02M 3/07 |
| 2021/0313892 | A1* | 10/2021 | Kim ................. | H02M 1/32 |
| 2022/0311339 | A1* | 9/2022 | Yen ................. | H02M 3/07 |
| 2023/0102278 | A1* | 3/2023 | Pardi ............... | H02M 3/07 323/282 |

(Continued)

OTHER PUBLICATIONS

International Search Report and Written Opinion of the International Searching Authority, International Application No. PCT/GB2023/052822, mailed Feb. 5, 2024.

(Continued)

*Primary Examiner* — Jue Zhang
*Assistant Examiner* — Jye-June Lee
(74) *Attorney, Agent, or Firm* — Jackson Walker L.L.P.

(57) ABSTRACT

Switched capacitor power converter circuitry configured to receive an input voltage and to output an output voltage, the switched capacitor power converter circuitry comprising: a switch network; a flying capacitor coupled to the switch network; and an output capacitor coupled to an output node of the switch network, wherein the switched capacitor power converter circuitry is operable in: a first mode in which the switch network operates at a fixed duty cycle; and a second mode in which the switch network operates at a variable duty cycle based on a predetermined flying capacitor charging threshold and a predetermined flying capacitor discharging threshold.

20 Claims, 8 Drawing Sheets (56) References Cited

U.S. PATENT DOCUMENTS

2023/0163684 A1* 5/2023 Liu .................. H02M 3/07
363/60

OTHER PUBLICATIONS

Redl, R. et al., "Ripple-Based Control of Switching Regulators—An Overview", IEEE Transactions on Power Electronics, Institute of Electrical and Electronics Engineers, USA, vol. 24, No. 12, Dec. 2009, pp. 2669-2680.
Kudva, Sudhir S. et al., "Fully Integrated Capacitive DC DC Converter with All-Digital Ripple Mitigation Technique", IEEE Journal of Solid-State Circuits, IEEE, USA, vol. 48, No. 8, Aug. 2013, pp. 1910-1920.

* cited by examiner

SWITCHED CAPACITOR POWER CONVERTER CIRCUITRY OPERABLE IN FIRST AND SECOND MODES

FIELD OF THE INVENTION

The present disclosure relates to switched capacitor power converter circuitry.

BACKGROUND

Power converter circuitry is used in many applications to convert an input voltage at a first level or magnitude to an output voltage at a second, different (i.e. higher or lower) level or magnitude.

One common application of power converter circuitry is in battery charging circuitry for portable devices such as mobile telephones, tablet computers and the like. In this application, an input DC voltage at a first level, received at the device from an external power supply such as an AC-DC adaptor, is converted to an output voltage at a second, lower, level suitable for charging a battery of the device by power converter circuitry.

Battery charging applications, particularly for fast charging, typically require a relatively high current to be delivered to the battery to be charged, and thus high efficiency power converter circuitry such as switched capacitor power converter circuitry is often used in such applications.

Figure 1:
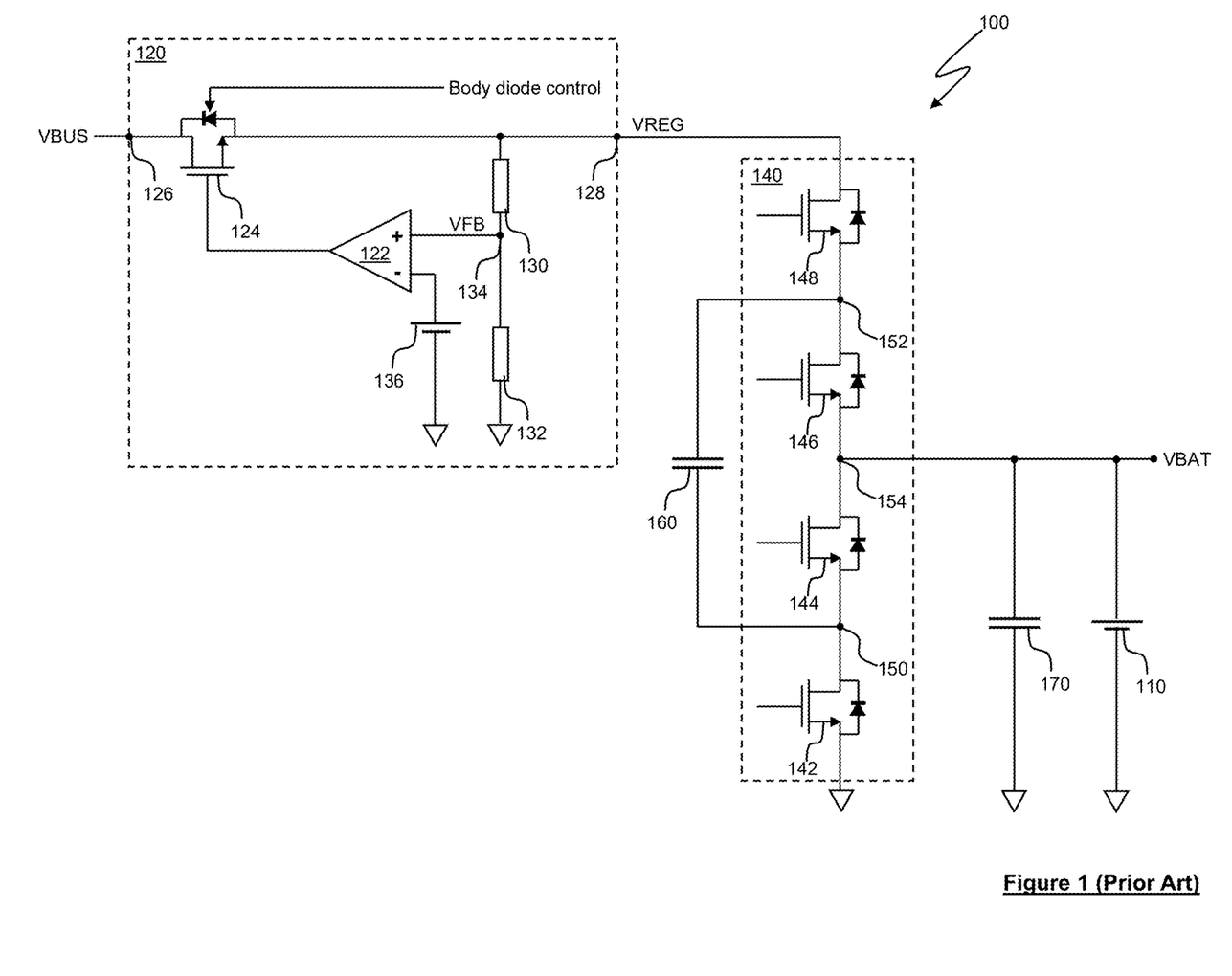
FIG. 1 is a schematic diagram illustrating example switched capacitor power converter circuitry.

FIG. 1 is a schematic diagram illustrating example switched capacitor power converter circuitry 100 for use in charging a battery 110. The switched capacitor power converter circuitry 100 in this example comprises low dropout regulator (LDO) circuitry 120, a switch network 140, a flying capacitor 160 and an output capacitor 170 coupled to a switch network output node 154 of the switch network 140, in parallel (in use of the switched capacitor power converter circuitry 100) with the battery 110.

The LDO circuitry 120 is configured to receive an input voltage VBUS (e.g. from an AC-DC mains power adaptor that is coupled, in use, to a host device that incorporates the switched capacitor power converter circuitry 100) and to output a regulated output voltage VREG to the switch network 140.

The LDO circuitry 120 comprises amplifier circuitry 122 having an output coupled to a control terminal of a pass device 124. In this example the pass device 124 is an N-channel MOSFET device and therefore its control terminal is a gate terminal. An input terminal of the pass device 124 (which in this example is a drain terminal of the N channel MOSFET device) is coupled to an LDO input node 126 of the LDO circuitry 120, which is in turn coupled to a voltage source that supplies the input voltage VBUS, such that the input voltage VBUS is received at the first terminal of the pass device 124. An output terminal of the pass device 124 (which in this example is a source terminal of the N channel MOSFET device) is coupled to an LDO output node 128 of the LDO circuitry 120 at which the regulated output voltage VOUT is output. The pass device 124 includes a body diode, having an anode coupled to the output terminal and a cathode coupled to the input terminal.

The output terminal of the pass device 124 is also coupled to a potential divider comprising first and second resistors 130, 132 coupled in series between the output terminal of the pass device 124 and a ground (or other reference voltage) supply rail. A potential divider output node 134 (between the first and second resistors 130, 132) is coupled to a non-inverting (+) input of the amplifier circuitry 122.

An inverting (−) input of the amplifier circuitry 122 is coupled to a reference voltage source, represented in FIG. 1 by a cell 136.

The LDO circuitry 120 operates in a generally conventional manner to compare a feedback voltage VFB, representative of the regulated output voltage VREG, at the non-inverting input of the amplifier circuitry 122 to the reference voltage at the inverting input of the amplifier circuitry 122 and to control the pass device 124 based on this comparison so as to maintain the regulated output voltage VREG at a target output voltage or within a target output voltage range.

The switch network 140 comprises first to fourth switches 142-148 coupled in series between the output node 128 of the LDO circuitry 120 and the ground (or other reference voltage) supply rail. In this example the switches 142-148 are N-channel MOSFET devices, each having a body diode with an anode coupled to the source terminal and a cathode coupled to the drain terminal. The switch network output node 154 is provided between the second and third switches 144, 146.

In use of the switched capacitor power converter circuitry 100, the switch network 140 is operable to couple the flying capacitor 160 in series with the output capacitor 170 in a first, charging, phase of operation, and to couple the flying capacitor 160 in parallel with the output capacitor 170 in a second, discharging phase of operation. The switched capacitor power converter circuitry 100 operates at a fixed frequency with a duty cycle of 50%, such that the charging phase and the discharging phase are symmetrical, in the sense that a duration of the charging phase is equal to a duration of the discharging phase.

Thus, in the first phase of operation, the second and fourth switches 144, 148 are closed and the first and third switches 142, 146 are open (in response to appropriate control signals from controller circuitry, which is not shown in FIG. 1), such that the flying capacitor 160 and the output capacitor 170 are coupled in series to form a capacitive potential divider, with an output voltage VBAT of the switched capacitor power converter circuitry 100 being dependent upon the regulated output voltage VREG and the capacitances of the flying capacitor 160 and the output capacitor 170. Over the course of the charging phase, the flying capacitor 160 charges up to a peak voltage and the output voltage VBAT increases to a peak output voltage VBATPEAK, which in this example is equal to VREG/2.

In the second phase of operation, the second and fourth switches 144, 148 are open and the first and third switches 142, 146 are closed (in response to appropriate control signals from controller circuitry, which is not shown in FIG. 1), such that the flying capacitor 160 and the output capacitor 160, 170 are coupled in parallel, and the output voltage VBAT of the switched capacitor power converter circuitry 100 is equal to the voltage across the flying capacitor 160 and the output capacitor 170. Over the course of the discharging phase, the flying capacitor 160 and the output capacitor 170 discharge such that the output voltage VBAT drops from the peak output voltage VBATPEAK to a minimum output voltage VBATMIN. The difference between the minimum output voltage VBATMIN and the peak output voltage VBATEAK may be referred to as the output ripple voltage of the switched capacitor power converter circuitry 100.

In the event of an overvoltage condition in the input voltage VBUS (i.e. when the input voltage VBUS exceeds an expected or rated voltage, e.g. as a result of a load transient), the LDO circuitry 120 can compensate to maintain the regulated output voltage VREG at the target output voltage or within the target output voltage range. In this way, the risk of overcharging of the battery 110, or of an overvoltage condition that could trigger an overvoltage protection mechanism, can be reduced.

In the event of an undervoltage condition (i.e. when the input voltage VBUS falls below an expected or rated voltage, e.g. as result of a load transient), the LDO circuitry 120 cannot compensate to maintain the regulated output voltage VREG at the target output voltage or within the target output voltage range, and so switching of the switch network 140 must be stopped to protect the system.

One feature of the switched capacitor power converter circuitry 100 of FIG. 1 is that when the switch network 140 is inactive (e.g. when all the switches 142-148 are switched off because charging of the battery 110 is not required), current can leak from the battery 110 to the LDO input node 126 through the body diodes of the switches 142-148 and the pass device 124, thus discharging the battery 110.

To prevent such leakage, body diode control may be implemented to prevent (or at least limit) the flow of current from the LDO output node 128 through the body diode of the pass device 124 to the LDO input node 126 when the switch network 140 is inactive. However, body diode control is only possible for specialised MOSFET devices, which are costly to produce and, due to process limitations, generally cannot tolerate drain-source voltages above about 5V. This approach is thus limited to applications in which the input voltage VBUS does not exceed 5V.

SUMMARY

According to a first aspect, the invention provides switched capacitor power converter circuitry configured to receive an input voltage and to output an output voltage, the switched capacitor power converter circuitry comprising:
 a switch network;
 a flying capacitor coupled to the switch network; and
 an output capacitor coupled to an output node of the switch network,
 wherein the switched capacitor power converter circuitry is operable in:
  a first mode in which the switch network operates at a fixed duty cycle; and
  a second mode in which the switch network operates at a variable duty cycle based on a predetermined flying capacitor charging threshold and a predetermined flying capacitor discharging threshold.

The switched capacitor power converter circuitry may further comprise voltage monitor circuitry for monitoring a voltage across the flying capacitor.

The fixed duty cycle may be 50%.

The switched capacitor power converter circuitry may be operable in the second mode in response to an input overvoltage condition or an input undervoltage condition.

The switched capacitor power converter circuitry may further comprise overvoltage comparator circuitry configured to compare the input voltage to an overvoltage threshold voltage and to output a signal indicative of detection of an overvoltage condition if the input voltage exceeds the overvoltage threshold voltage.

The switched capacitor power converter circuitry may be operative in an overvoltage control mode in response to detection of an overvoltage condition.

In operation of the switched capacitor power converter circuitry in the overvoltage control mode, a duration of a charging phase of operation may be defined by a first predetermined flying capacitor charging threshold and a duration of a discharging phase of operation may be defined by a first predetermined flying capacitor discharging threshold.

In the charging phase of operation, the flying capacitor and the output capacitor may be coupled in series and the flying capacitor may receive the input voltage so as to charge up to the first predetermined flying capacitor charging threshold.

In the discharging phase of operation, the flying capacitor and the output capacitor may be coupled in parallel and the flying capacitor may discharge to the first predetermined flying capacitor discharging threshold.

The switched capacitor power converter circuitry may further comprise undervoltage comparator circuitry configured to compare the input voltage to an undervoltage threshold voltage and to output a signal indicative of detection of an undervoltage condition if the input voltage falls below the undervoltage threshold voltage.

The switched capacitor power converter circuitry may be operative in an undervoltage control mode in response to detection of an undervoltage condition.

In operation of the switched capacitor power converter circuitry in the undervoltage control mode, a duration of a charging phase of operation may be defined by a second predetermined flying capacitor charging threshold and a duration of a discharging phase of operation may be defined by a second predetermined flying capacitor discharging threshold.

In the charging phase of operation, the flying capacitor and the output capacitor may be coupled in parallel and may each receive the input voltage so as to charge up to the second predetermined flying capacitor charging threshold In the discharging phase of operation, the flying capacitor and the output capacitor may be coupled in parallel and the flying capacitor may discharge to the second predetermined flying capacitor discharging threshold.

The switch network may comprise first to fourth switches coupled between an input and a reference voltage supply rail. A first terminal of the flying capacitor may be coupled to a node between the first and second switches and a second terminal of the flying capacitor may be coupled to a node between the third and fourth switches.

The switched capacitor power converter circuitry may further comprise an input switch having a body diode configured to block current flow in a direction from the output node of the switch network to an input voltage supply which supplies the input voltage.

According to a second aspect, the invention provides battery charger circuitry comprising switched capacitor power converter circuitry according to the first aspect.

According to a third aspect, the invention provides switched capacitor power converter circuitry comprising:
 a switch network; and
 a flying capacitor coupled to the switch network; and
 an output capacitor coupled to an output node of the switch network,
 wherein the switched capacitor power converter circuitry is operable in:
  a first mode in which:
   during a charging phase of operation, the switch network adopts a configuration in which the flying capacitor and the output capacitor are coupled in series and the flying capacitor is coupled to an input voltage node; and during a discharging phase of operation, the switch network adopts a configuration in which the flying capacitor and the output capacitor are coupled in parallel; and a second mode in which:

during a charging phase of operation, the switch network adopts a configuration in which the flying capacitor and the output capacitor are coupled in parallel and the flying capacitor and the output capacitor are both coupled to the input voltage node; and during a discharging phase of operation, the switch network adopts a configuration in which the flying capacitor and the output capacitor are coupled in parallel.

According to a fourth aspect, the invention provides switched capacitor power converter circuitry comprising:

a switch network configured to receive an input voltage;

a flying capacitor coupled to an output of the switch network; and mode control circuitry configured to control operation of the switched capacitor power converter circuitry based on the input voltage, such that:

the switched capacitor power converter circuitry operates in an overvoltage mode in which a duty cycle is dependent upon first predefined output ripple voltage limits in the event of an input overvoltage condition;

the switched capacitor power converter circuitry operates in an undervoltage mode in which the duty cycle is dependent upon second predefined output ripple voltage limits in the event of an input undervoltage condition; and the switched capacitor power converter circuitry operates in a normal mode with a fixed duty cycle in the absence of an input overvoltage or input undervoltage condition.

According to a fifth aspect, the invention provides an integrated circuit comprising switched capacitor power converter circuitry according to the first aspect.

According to a sixth aspect, the invention provides a host device comprising switched capacitor power converter circuitry according to the first aspect.

The host device may comprise a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console a VR or AR device, a mobile telephone, a portable audio player or other portable device.

BRIEF DESCRIPTION OF THE DRAWINGS

Embodiments of the invention will now be described, strictly by way of example only, with reference to the accompanying drawings, of which.

DETAILED DESCRIPTION

Figure 2:
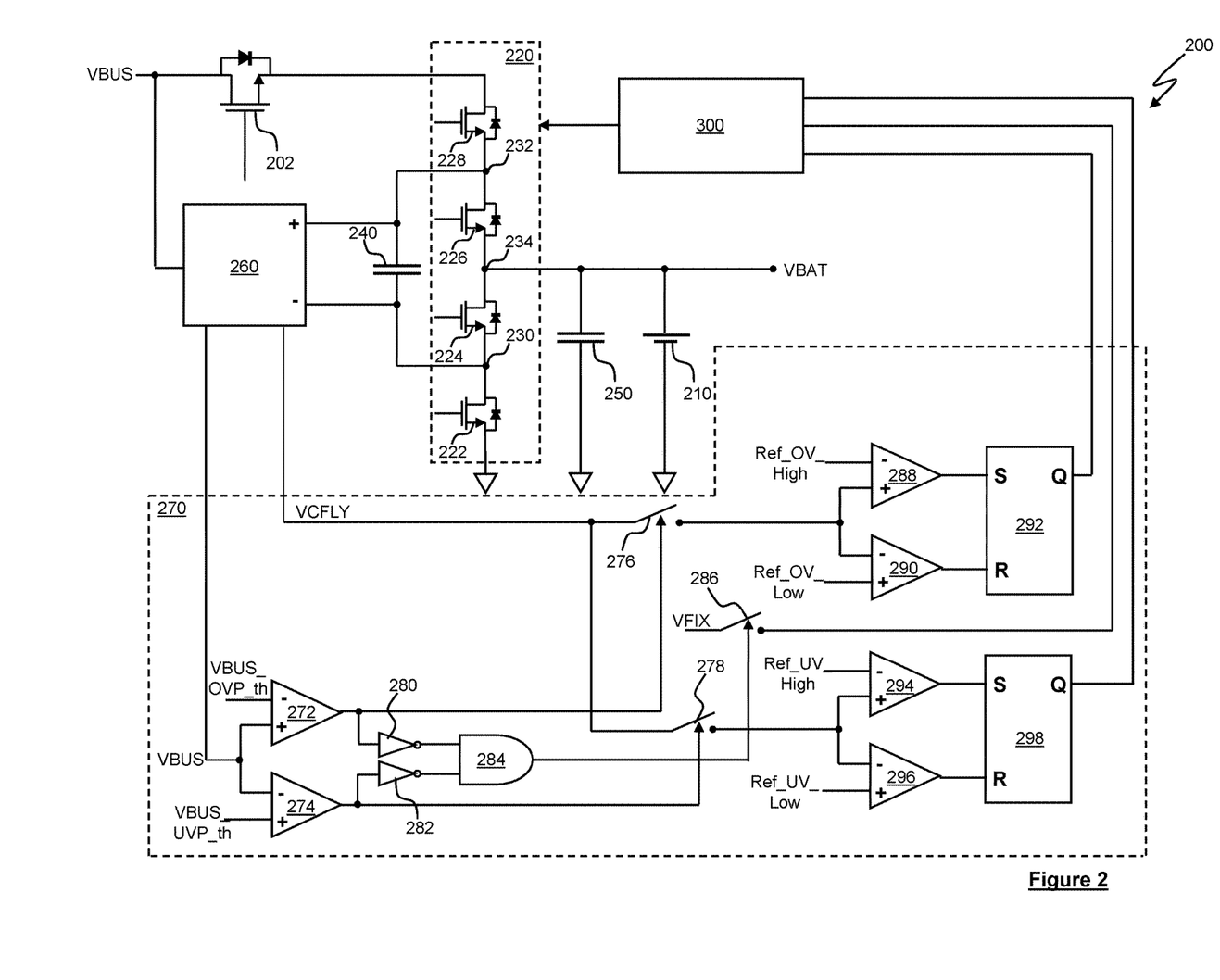
FIG. 2 is a schematic diagram illustrating example switched capacitor power converter circuitry according to the present disclosure.

FIG. 2 is a schematic diagram illustrating example switched capacitor power converter circuitry 200 according to the present disclosure, which in this example can be used to charge a battery 210.

The switched capacitor power converter circuitry 200 comprises an input switch 202, a switch network 220, a flying capacitor 240, an output capacitor 250, voltage monitor circuitry 260, mode control circuitry 270 and switch network control circuitry 300.

The battery 210 to be charged (or some other load that is to receive electrical power from the switched capacitor power converter circuitry 200) is coupled to an output node 234 of the switch network 220.

The input switch 202 in this example is an N-channel MOSFET device having a body diode with an anode coupled to the drain terminal and a cathode coupled to the source terminal.

An input terminal (which in this example is the MOSFET's drain terminal) of the input switch 202 is coupled to a voltage source that supplies an input voltage VBUS, such that the input voltage VBUS is received at the input terminal of the input switch 202. An output terminal (which in this example is the MOSFET's source terminal) of the input switch 102 is coupled to an input terminal of the switch network 220.

Thus, when the input switch 102 is switched on by means of a suitable control voltage applied to its control terminal (which in this example is the MOSFET's gate terminal), the input voltage VBUS can be supplied to the switch network 220. However, current flow in the opposite direction, from the battery 210 (or other load) to the input terminal of the input switch 202, is blocked by the body diode.

The switch network 220 comprises first to fourth switches 222-228, which in this example are N channel MOSFET devices, coupled in series between the output terminal of the input switch 202 and a ground (or other reference voltage) supply rail.

A first terminal of the flying capacitor 240 is coupled to a first node 230 of the switch network 220, which is between the first and second switches 222, 224. A second terminal of the flying capacitor 240 is coupled to a second node 232 of the switch network 220, which is between the third and fourth switches 226, 228. The output node 234 of the switch network 220 is between the second and third switches 224, 226.

The output capacitor 250 is coupled between the output node 234 of the switch network 220 and the ground (or other defence voltage) supply rail, in parallel with the battery 210.

First and second inputs of the voltage monitor circuitry 260 are coupled to the first and second terminals (respectively) of the flying capacitor 240. A first output of the voltage monitor circuitry 260 is coupled to a first input of the mode control circuitry 270 so as to output a signal indicative of a voltage VCFLY across the flying capacitor 240 to the mode control circuitry 270.

A third input of the voltage monitor circuitry 260 is coupled to the voltage source that supplies the input voltage VBUS. A second output of the voltage monitor circuitry 260 is coupled to a second input of the mode control circuitry 270 so as to supply the voltage VBUS to the mode control circuitry 270.

The mode control circuitry 270 is configured to control the operation of the switched capacitor power converter circuitry 200, based on the input voltage VBUS. The switched capacitor power converter circuitry 200 is operable in a first mode, in which the switch network 220 operates at a fixed duty cycle, and a second mode, in which the switch network operates at a variable duty cycle.

The mode control circuitry 270 includes input overvoltage detection circuitry and input undervoltage detection circuitry for detecting (respectively) an overvoltage condition or an undervoltage condition of the input voltage VBUS. The mode control circuitry 270 further includes overvoltage mode control circuitry for controlling operation of the switched capacitor power converter circuitry 200 when an input overvoltage condition is detected, and undervoltage mode control circuitry for controlling operation of the switched capacitor power converter circuitry 200 when an input undervoltage condition is detected.

The input overvoltage detection circuitry comprises overvoltage comparator circuitry 272 having an inverting (−) input that receives an overvoltage threshold voltage VBUS_OVP_th and a non-inverting (+) input that receives the input voltage VBUS. An output of the overvoltage comparator circuitry 272 is coupled to a control terminal of an overvoltage control switch 276.

In operation of the switched capacitor power converter circuitry 200, the overvoltage comparator circuitry 272 compares the input voltage VBUS to the overvoltage threshold voltage VBUS_OVP_th.

While the input voltage VBUS is lower than the overvoltage threshold voltage VBUS_OVP_th (indicating that no input overvoltage condition exists), the output of the overvoltage comparator circuitry 272 remains low and the overvoltage control switch 276 remains open.

In the event of an input overvoltage condition, the input voltage VBUS (and the voltage VCFLY across the flying capacitor 240) increase. If the input voltage VBUS exceeds the overvoltage threshold voltage VBUS_OVP_th (indicating that an input overvoltage condition exists), the output of the overvoltage comparator circuitry 272 goes high, causing the overvoltage control switch 276 to close, activating the overvoltage mode control circuitry such that the switched capacitor power converter circuitry 200 enters an input overvoltage mode of operation, which is described in more detail below.

The input undervoltage detection circuitry comprises undervoltage comparator circuitry 274 having a non-inverting (+) input that receives an undervoltage threshold voltage VBUS_UVP_th and an inverting (−) input that receives the input voltage VBUS. An output of the undervoltage comparator circuitry 274 is coupled to a control terminal of an undervoltage control switch 278.

In operation of the switched capacitor power converter circuitry 200, the undervoltage comparator circuitry 274 compares the input voltage VBUS to the undervoltage threshold voltage VBUS_UVP_th.

While the input voltage VBUS is greater than the undervoltage threshold voltage VBUS_UVP_th (indicating that no input undervoltage condition exists), the output of the undervoltage comparator circuitry 274 remains low and the undervoltage control switch 278 remains open.

In the event of an input undervoltage condition, the input voltage VBUS (and the voltage VCFLY across the flying capacitor 240) decrease. If the input voltage VBUS falls below the undervoltage threshold voltage VBUS_UVP_th (indicating that an input overvoltage condition exists), the output of the undervoltage comparator circuitry 274 goes high, causing the undervoltage control switch 278 to close, activating the undervoltage mode control circuitry such that the switched capacitor power converter circuitry 200 enters an input undervoltage mode of operation, which is described in more detail below.

The outputs of the overvoltage comparator circuitry 272 and the undervoltage comparator circuitry 274 are also coupled, via respective first and second inverters 280, 282, to inputs of an AND gate 284. An output of the AND gate 284 is coupled to a control terminal of a normal mode control switch 286. When the outputs of the overvoltage comparator circuitry 272 and the undervoltage comparator circuitry 274 are both low (indicating that neither an input overvoltage condition nor an input undervoltage condition) exists, the output of the NAND gate 284 is high, causing the normal mode control switch 286 to be closed. This has the effect of outputting a fixed reference voltage VFIX to an input of the switch network control circuitry 300, to cause the switched capacitor power converter circuitry 200 to operate in its normal mode of operation, as described in more detail below.

The overvoltage mode control circuitry comprises first overvoltage mode comparator circuitry 288 having an inverting (−) input which receives a predefined overvoltage mode charging threshold voltage Ref_OV_High and a non-inverting (+) input which receives the voltage VCFLY across the flying capacitor 240. An output of the first overvoltage mode comparator circuitry 288 is coupled to an S (set) input of overvoltage mode SR flip-flop circuitry 292. A Q output of the overvoltage mode SR flip-flop circuitry is coupled to an input of the switch network control circuitry 300 so as to provide overvoltage mode control signals to the switch network control circuitry 300, which in turn controls the switch network 220 based on the received overvoltage mode control signals.

In operation of the switched capacitor power converter circuitry 200 in its overvoltage mode (i.e. when an input overvoltage condition has been detected, e.g. by the overvoltage comparator circuitry 272 as described above), while the voltage VCFLY is less than the predefined overvoltage mode charging threshold voltage Ref_OV_High, the output of the first overvoltage mode comparator circuitry 288 remains low and so the Q output of the overvoltage mode SR flip-flop circuitry 292 also remains low. The switch network control circuitry 300 thus receives an overvoltage mode control voltage signal indicating that the voltage VCFLY across the flying capacitor 240 has not reached the predefined overvoltage mode charging threshold Ref_OV_High. In response to this overvoltage mode control signal, the switch network control circuitry 300 outputs suitable control signals to the switch network 220 to cause the switches 222-228 to adopt an overvoltage mode charging phase configuration, as described in more detail below.

When the voltage VCFLY is greater than the predefined overvoltage mode charging threshold voltage Ref_OV_High, the output of the first overvoltage mode comparator circuitry 288 goes high and so the Q output of the overvoltage mode SR flip-flop circuitry 292 also goes high. The switch network control circuitry 300 thus receives an overvoltage mode control voltage signal indicating that the voltage VCFLY across the flying capacitor 240 has reached the predefined overvoltage mode charging threshold Ref_OV_High. In response to this overvoltage mode control signal, the switch network control circuitry 300 outputs suitable control signals to the switch network 220 to cause the switches 222-228 to adopt an overvoltage mode discharge phase configuration, as described in more detail below.

The overvoltage mode control circuitry further comprises second overvoltage mode comparator circuitry 290 having a non-inverting (+) input which receives a predefined overvoltage mode discharging threshold voltage Ref_OV_Low and an inverting (−) input which receives the voltage VCFLY across the flying capacitor 240. An output of the second overvoltage mode comparator circuitry 290 is coupled to an R (reset) input of the overvoltage mode SR flip-flop circuitry 292.

In operation of the switched capacitor power converter circuitry 200 in its overvoltage mode (i.e. when an input overvoltage condition has been detected, e.g. by the overvoltage comparator circuitry 272 as described above), while the voltage VCFLY is greater than the predefined overvoltage mode discharging threshold voltage Ref_OV_Low, the output of the second overvoltage mode comparator circuitry 290 remains low and so the Q output of the overvoltage mode SR flip-flop circuitry 292 remains high. The switch network control circuitry 300 thus receives an overvoltage mode control voltage signal indicating that the voltage VCFLY across the flying capacitor 240 has not fallen below the predefined overvoltage mode discharging threshold Ref_OV_Low. In response to this overvoltage mode control signal, the switch network control circuitry 300 outputs suitable control signals to the switch network 220 to cause the switches 222-228 to adopt (or maintain) the overvoltage mode discharge phase configuration, as described in more detail below.

When the voltage VCFLY falls below the predefined overvoltage mode discharging threshold voltage Ref_OV_Low, the output of the second overvoltage mode comparator circuitry 290 goes low and so the Q output of the overvoltage mode SR flip-flop circuitry 292 goes high. The switch network control circuitry 300 thus receives an overvoltage mode control voltage signal indicating that the voltage VCFLY across the flying capacitor 240 has fallen below the predefined overvoltage mode discharging threshold voltage Ref_OV_Low. In response to this overvoltage mode control signal, the switch network control circuitry 300 outputs suitable control signals to the switch network 220 to cause the switches 222-228 to adopt the overvoltage mode charging phase configuration, as described in more detail below.

As will be appreciated from the foregoing description of the overvoltage mode control circuitry, when operating in an overvoltage mode (e.g. when an input overvoltage condition has been detected), the duty cycle of the switched capacitor power converter circuitry 200 is not fixed, but is instead dependent upon the predefined overvoltage mode charging and discharging threshold voltages Ref_OV_Low, Ref_OV_High, which govern the duration of the charging and discharge phases of operation of the switched capacitor power converter circuitry 200 (since the charging phase ends when the flying capacitor voltage VCFLY reaches the charging threshold voltage Ref_OV_High, and the discharging phase ends when the flying capacitor voltage VCFLY falls below the discharging threshold voltage Ref_OV_Low). As will be appreciated by those skilled in the art, the predefined overvoltage mode charging and discharging threshold voltages Ref_OV_High, Ref_OV_Low thus define respective upper and lower output ripple voltage limits for the switched capacitor power converter circuitry 200 when operating in its overvoltage mode.

The undervoltage mode control circuitry comprises first undervoltage mode comparator circuitry 294 having an inverting (−) input which receives a predefined undervoltage mode charging threshold voltage Ref_UV_High and a non-inverting (+) input which receives the voltage VCFLY across the flying capacitor 240. An output of the first undervoltage mode comparator circuitry 294 is coupled to an S (set) input of undervoltage mode SR flip-flop circuitry 298. A Q output of the undervoltage mode SR flip-flop circuitry is coupled to an input of the switch network control circuitry 300 so as to provide undervoltage mode control signals to the switch network control circuitry 300, which in turn controls the switch network 220 based on the received undervoltage mode control signals.

In operation of the switched capacitor power converter circuitry 200 in its undervoltage mode (i.e. when an input undervoltage condition has been detected, e.g. by the undervoltage comparator circuitry 274 as described above), while the voltage VCFLY is less than the predefined undervoltage mode charging threshold voltage Ref_UV_High, the output of the first undervoltage mode comparator circuitry 294 remains low and so the Q output of the undervoltage mode SR flip-flop circuitry 298 also remains low. The switch network control circuitry 300 thus receives an undervoltage mode control voltage signal indicating that the voltage VCFLY across the flying capacitor 240 has not reached the predefined undervoltage mode charging threshold Ref_UV_High. In response to this undervoltage mode control signal, the switch network control circuitry 300 outputs suitable control signals to the switch network 220 to cause the switches 222-228 to adopt an undervoltage mode charging phase configuration, as described in more detail below.

When the voltage VCFLY is greater than the predefined undervoltage mode charging threshold voltage Ref_UV_High, the output of the first undervoltage mode comparator circuitry 294 goes high and so the Q output of the undervoltage mode SR flip-flop circuitry 298 also goes high. The switch network control circuitry 300 thus receives an undervoltage mode control voltage signal indicating that the voltage VCFLY across the flying capacitor 240 has reached the predefined undervoltage mode charging threshold voltage Ref_UV_High. In response to this undervoltage mode control signal, the switch network control circuitry 300 outputs suitable control signals to the switch network 220 to cause the switches 222-228 to adopt an undervoltage mode discharge phase configuration, as described in more detail below.

The undervoltage mode control circuitry further comprises second undervoltage mode comparator circuitry 296 having a non-inverting (+) input which receives a predefined undervoltage mode discharging threshold voltage Ref_UV_Low and an inverting (−) input which receives the voltage VCFLY across the flying capacitor 240. An output of the second undervoltage mode comparator circuitry 296 is coupled to an R (reset) input of the undervoltage mode SR flip-flop circuitry 298.

In operation of the switched capacitor power converter circuitry 200 in its undervoltage mode (i.e. when an input undervoltage condition has been detected), while the voltage VCFLY is greater than the predefined undervoltage mode discharging threshold voltage Ref_UV_Low, the output of the second undervoltage mode comparator circuitry 296 remains low and so the Q output of the undervoltage SR flip-flop circuitry 298 remains high. The switch network control circuitry 300 thus receives an undervoltage mode control voltage signal indicating that the voltage VCFLY across the flying capacitor 240 has not fallen below the predefined undervoltage mode discharging threshold Ref_UV_Low. In response to this overvoltage mode control signal, the switch network control circuitry 300 outputs suitable control signals to the switch network 220 to cause the switches 222-228 to adopt the undervoltage mode discharge phase configuration, as described in more detail below.

When the voltage VCFLY falls below the predefined undervoltage mode discharging threshold voltage Ref_UV_Low, the output of the second undervoltage mode comparator circuitry 296 goes low and so the Q output of the undervoltage mode SR flip-flop circuitry 298 goes high. The switch network control circuitry 300 thus receives an undervoltage mode control voltage signal indicating that the voltage VCFLY across the flying capacitor 240 has fallen below the predefined undervoltage mode discharging threshold voltage Ref_UV_Low. In response to this undervoltage mode control signal, the switch network control circuitry 300 outputs suitable control signals to the switch network 220 to cause the switches 222-228 to adopt (or maintain) the undervoltage mode charging phase configuration, as described in more detail below.

As will be appreciated from the foregoing description of the undervoltage mode control circuitry, when operating in an undervoltage mode (e.g. when an input undervoltage condition has been detected), the duty cycle of the switched capacitor power converter circuitry is not fixed, but is instead dependent upon the predefined undervoltage mode charging and charging threshold voltages Ref_UV_High, Ref_UV_Low, which govern the duration of the charging and discharge phases of operation of the switched capacitor power converter circuitry 200 (since the charging phase ends when the flying capacitor voltage VCFLY reaches the charging threshold voltage Ref_UV_High, and the discharging phase ends when the flying capacitor voltage VCFLY falls below the discharging threshold voltage Ref_UV_Low). As will be appreciated by those skilled in the art, the predefined undervoltage mode charging and discharging threshold voltages Ref_UV_High, Ref_UV_Low thus define respective upper and lower output ripple voltage limits for the switched capacitor power converter circuitry 200 when operating in its undervoltage mode.

Operation of the switched capacitor power converter circuitry 200 in its normal mode of operation (i.e. when no input undervoltage or overvoltage condition has been detected) will now be described with reference to FIGS. 3a and 3b.

In the normal mode of operation, the switched capacitor power converter circuitry 200 operates at a fixed frequency with a 50% duty cycle such that the charging and discharging phases are symmetrical, in the sense that they have the same duration.

Figure 3A:
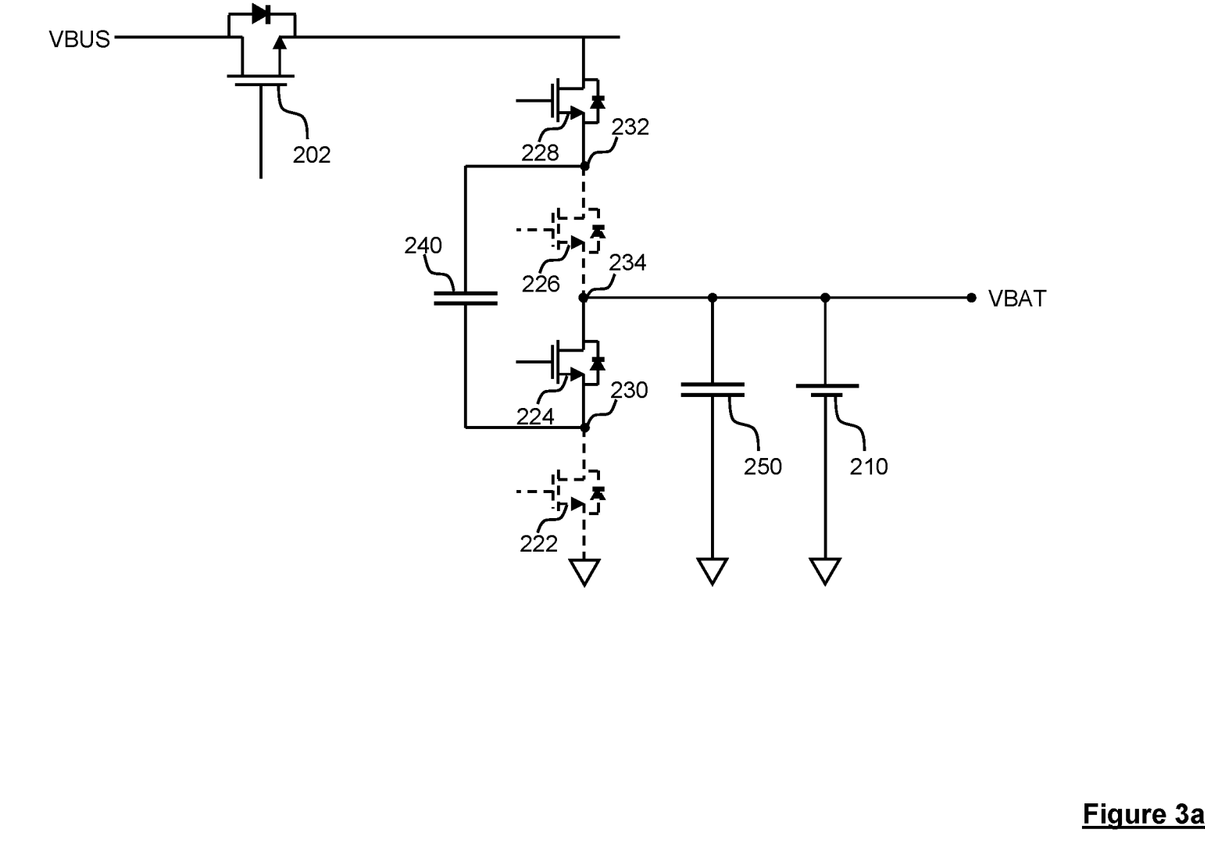
FIGS. 3a-3f are schematic diagrams illustrating the operation of the switched capacitor power converter circuitry of FIG. 2.

FIG. 3a shows a configuration of the switches 222-228 in a charging phase in the normal mode of operation. In this normal mode charging phase configuration, the input switch 202 and the second and fourth switches 224, 228 are turned on and the first and third switches 222, 226 are turned off (and are thus shown in dashed outline in FIG. 3a), in response to suitable control signals output by the switch network control circuitry 300.

Thus, in the charging phase the flying capacitor 240 is coupled in series with the output capacitor 250 between the input switch 202 and the ground (or other reference voltage) supply rail. The flying capacitor 240 and the output capacitor 250 therefore form a capacitive potential divider, with the output voltage VBAT of the switched capacitor power converter circuitry 200 being dependent upon the input voltage VBUS and the capacitances of the flying capacitor 240 and the output capacitor 250. Over the course of the charging phase, the flying capacitor 240 charges up to a peak voltage and the output voltage VBAT increases to a peak output voltage VBATPEAK. If the capacitances of the flying capacitor 240 and the output capacitor 250 are equal, the flying capacitor 240 will charge to half the input voltage (i.e. VBUS/2) and thus the peak output voltage VBATPEAK will be VBUS/2.

Figure 3B:
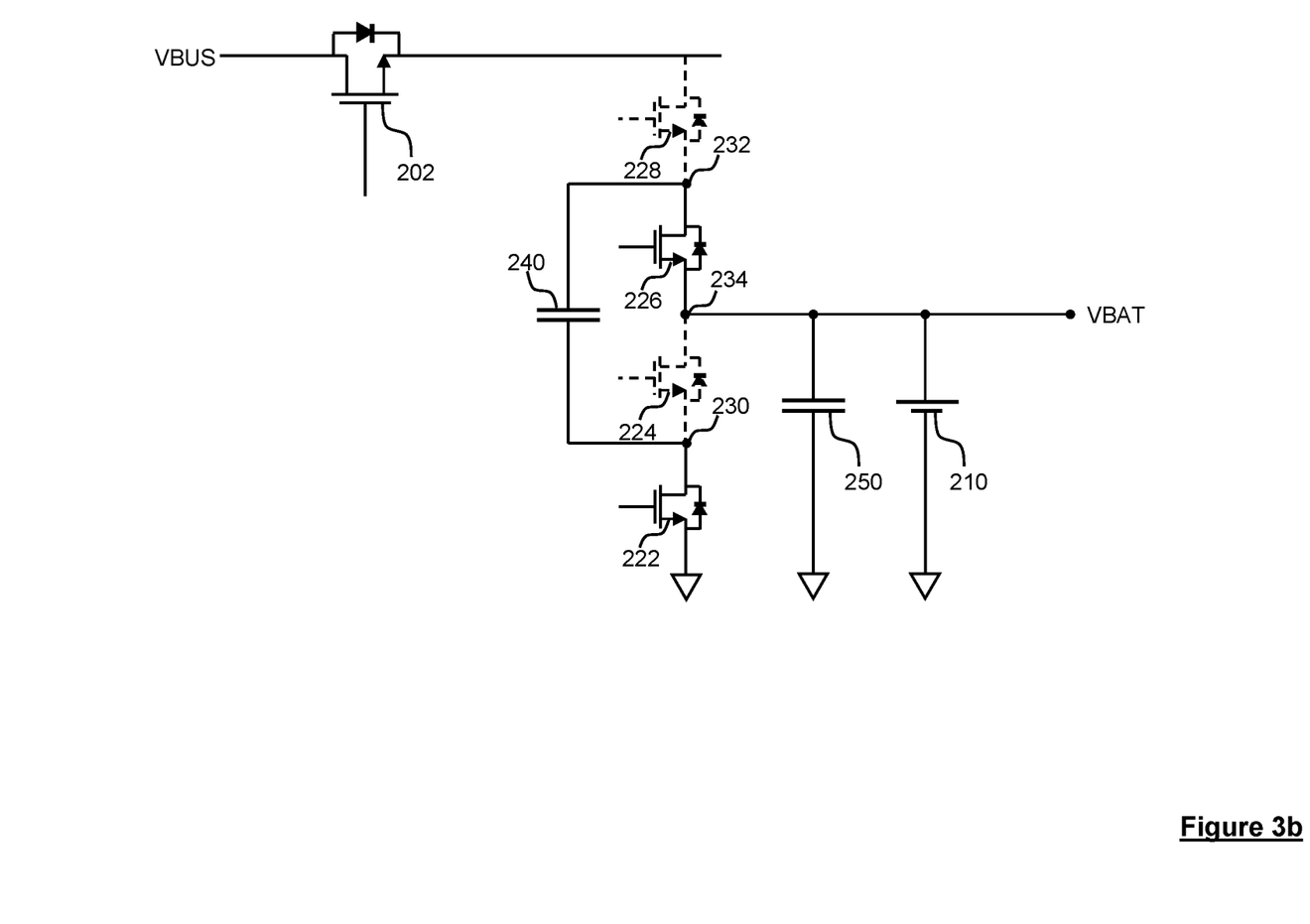

FIG. 3b shows a configuration of the switches 222-228 in a discharge phase in the normal mode of operation. In this discharge phase configuration, the first and third switches 222, 226 are turned on and the second and fourth switches 224, 228 are turned off (and are thus shown in dashed outline in FIG. 3b), in response to suitable control signals output by the switch network control circuitry 300.

Thus, in the discharge phase the flying capacitor 240 is coupled in parallel with the output capacitor 250 between the input switch 202 and the ground (or other reference voltage) supply rail. The flying capacitor 240 and the output capacitor 250 are therefore coupled in parallel. Over the course of the discharging phase, the flying capacitor 240 and the output capacitor 250 discharge such that the output voltage VBAT drops from the peak output voltage VBATPEAK to a minimum output voltage VBATMIN.

As noted above, in an input overvoltage mode of operation of the switched capacitor power converter circuitry 200, the duty cycle is not fixed but is instead dependent upon the predefined overvoltage mode charging and discharging threshold voltages Ref_OV_High, Ref_OV_Low (which define respective minimum and maximum or peak ripple voltage limits for the switched capacitor power converter circuitry 200 when operating in its overvoltage mode), such that the charging and discharging phases are asymmetrical, in the sense that they have different durations.

Figure 3C:
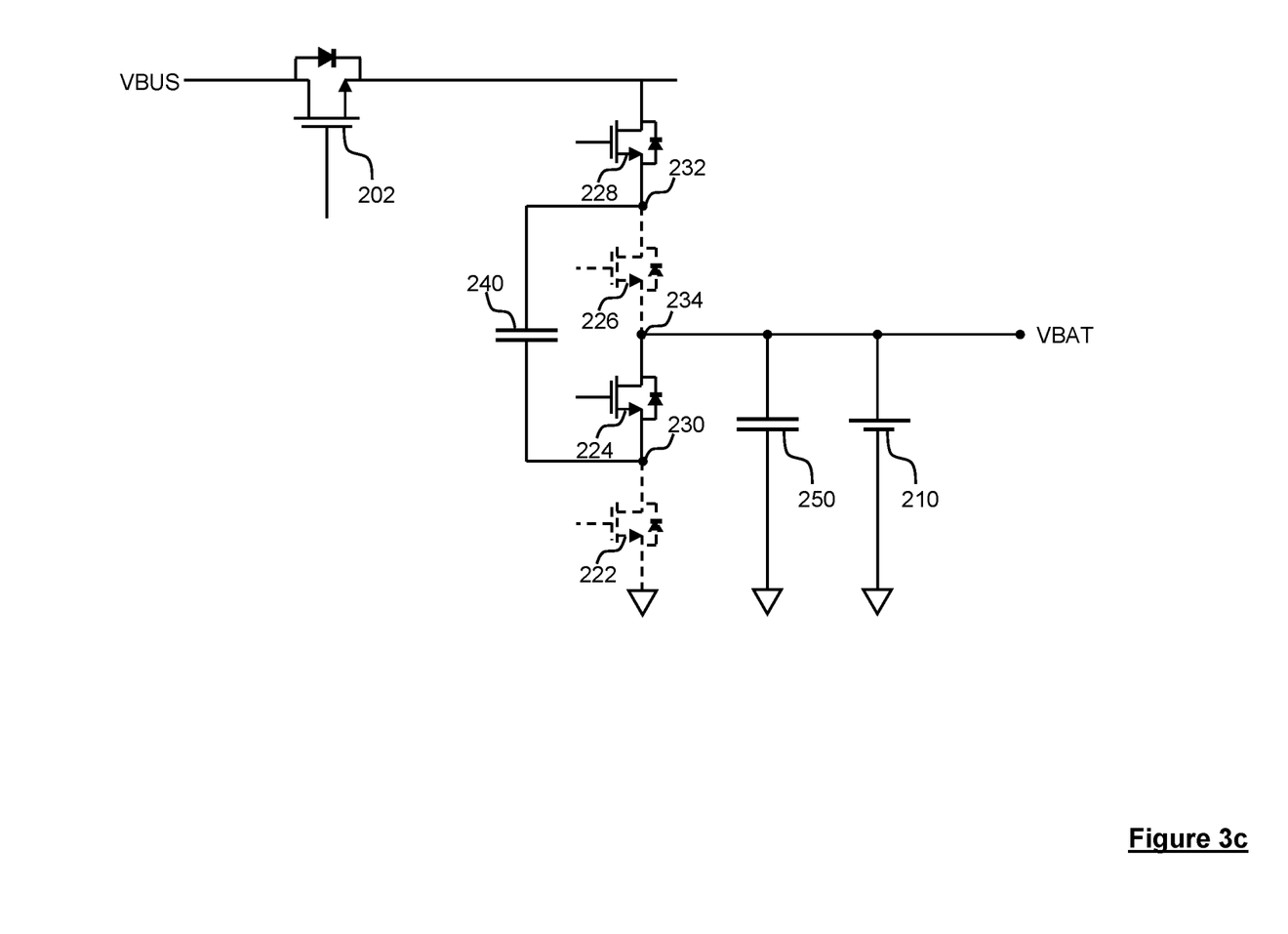

FIG. 3c shows a configuration of the switches 222-228 in a charging phase in the input overvoltage mode of operation. In this input overvoltage mode charging phase configuration, the input switch 202 and the second and fourth switches 224, 228 are turned on and the first and third switches 222, 226 are turned off (and are thus shown in dashed outline in FIG. 3c), in response to suitable control signals output by the switch network control circuitry 300.

Thus, in the input overvoltage mode charging phase the flying capacitor 240 is coupled in series with the output capacitor 250 between the input switch 202 and the ground (or other reference voltage) supply rail. The flying capacitor 240 and the output capacitor 250 therefore form a capacitive potential divider. However, unlike in the charge phase in the normal mode of operation described above with reference to FIG. 3a, in the input overvoltage mode charging phase the output voltage VBAT of the switched capacitor power converter circuitry 200 is dependent upon the duration of the charging phase, which is in turn dependent upon the predefined overvoltage mode charging threshold voltage Ref_OV_High. Thus, over the course of the charging phase, the flying capacitor charges up to the overvoltage mode charging threshold voltage Ref_OV_High.

As described above with reference to FIG. 2, the switch network control circuitry 300 outputs suitable control signals to the switch network 220 to cause the switches 222-228 to adopt this input overvoltage mode charging phase configuration when the voltage VCFLY across the flying capacitor 240 is less than the predefined overvoltage mode charging threshold voltage Ref_OV_High. When the voltage CFLY reaches the predefined overvoltage mode charging threshold Ref_OV_High, the switch network control circuitry 300 outputs suitable control signals to the switch network 220 to cause the switches to adopt an input overvoltage mode discharge phase configuration.

Figure 3D:
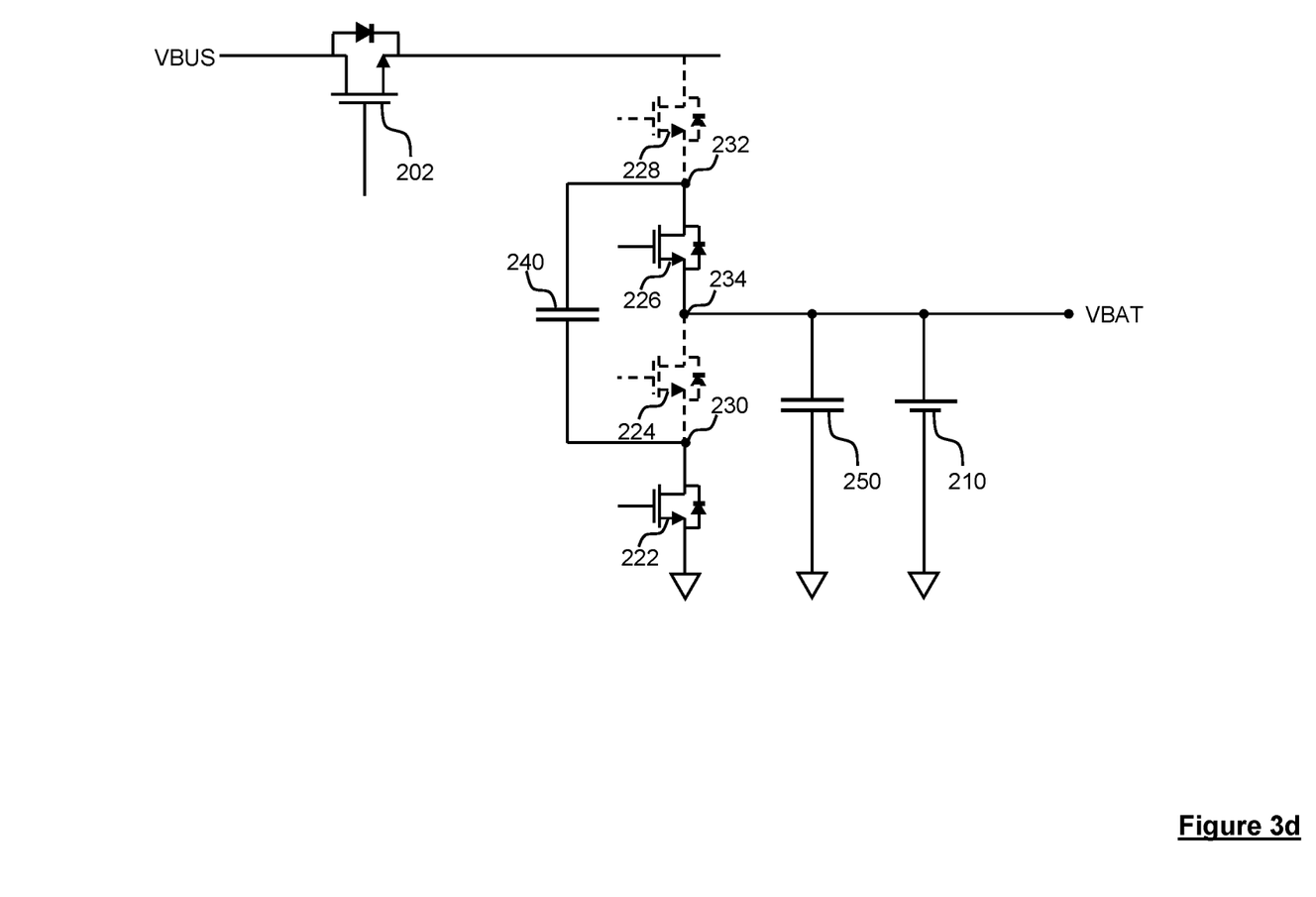

FIG. 3d shows a configuration of the switches 222-228 in a discharge phase in the input overvoltage mode of operation. In this discharge phase configuration, the first and third switches 222, 226 are turned on and the second and fourth switches 224, 228 are turned off (and are thus shown in dashed outline in FIG. 3d), in response to suitable control signals output by the switch network control circuitry 300.

Thus, in the discharge phase the flying capacitor 240 is coupled in parallel with the output capacitor 250 between the input switch 202 and the ground (or other reference voltage) supply rail. The flying capacitor 240 and the output capacitor 250 are therefore coupled in parallel. Over the course of the discharging phase, the flying capacitor 240 and the output capacitor 250 discharge such that the output voltage VBAT drops from the overvoltage mode discharging threshold voltage Ref_OV_LOW to the overvoltage mode charging threshold voltage Ref_OV_High.

As described above with reference to FIG. 2, the switch network control circuitry 300 outputs suitable control signals to the switch network 220 to cause the switches 222-228 to adopt this input overvoltage mode discharge phase configuration when the voltage VCFLY across the flying capacitor 240 is greater than the predefined overvoltage mode discharging threshold voltage Ref_OV_Low. When the voltage CFLY falls below the predefined overvoltage mode discharging threshold Fef_OV_Low, the switch network control circuitry 300 outputs suitable control signals to the switch network 220 to cause the switches to adopt the input overvoltage mode charging phase configuration shown in FIG. 3c.

The predefined overvoltage mode charging threshold voltage Ref_OV_High and the predefined overvoltage mode discharging threshold voltage Ref_OV_Low may be selected to ensure that during an overvoltage event the output voltage VBAT does not exceed a safe input voltage for the battery 210 (or any load that may be coupled to the output of the switched capacitor power converter circuitry 200), thus preventing the load from a potentially damaging voltage, while also ensuring that sufficient power can be supplied to the load. In some examples the overvoltage mode charging threshold voltage Ref_OV_High may be set to half the input voltage VBUS, such that during the charging phase the flying capacitor 240 charges up to a voltage that is higher than would be reached in the normal mode of operation, because the input voltage VBUS during an overvoltage condition is higher than the input voltage during normal operation.

In an input undervoltage mode of operation of the switched capacitor power converter circuitry 200, the duty cycle is again not fixed but is instead dependent upon the predefined undervoltage mode discharging and charging threshold voltages Ref_UV_Low, Ref_OUV_High (which define respective peak and minimum ripple voltage limits for the switched capacitor power converter circuitry 200 when operating in its undervoltage mode), such that the charging and discharging phases are asymmetrical, in the sense that they have different durations.

Figure 3E:
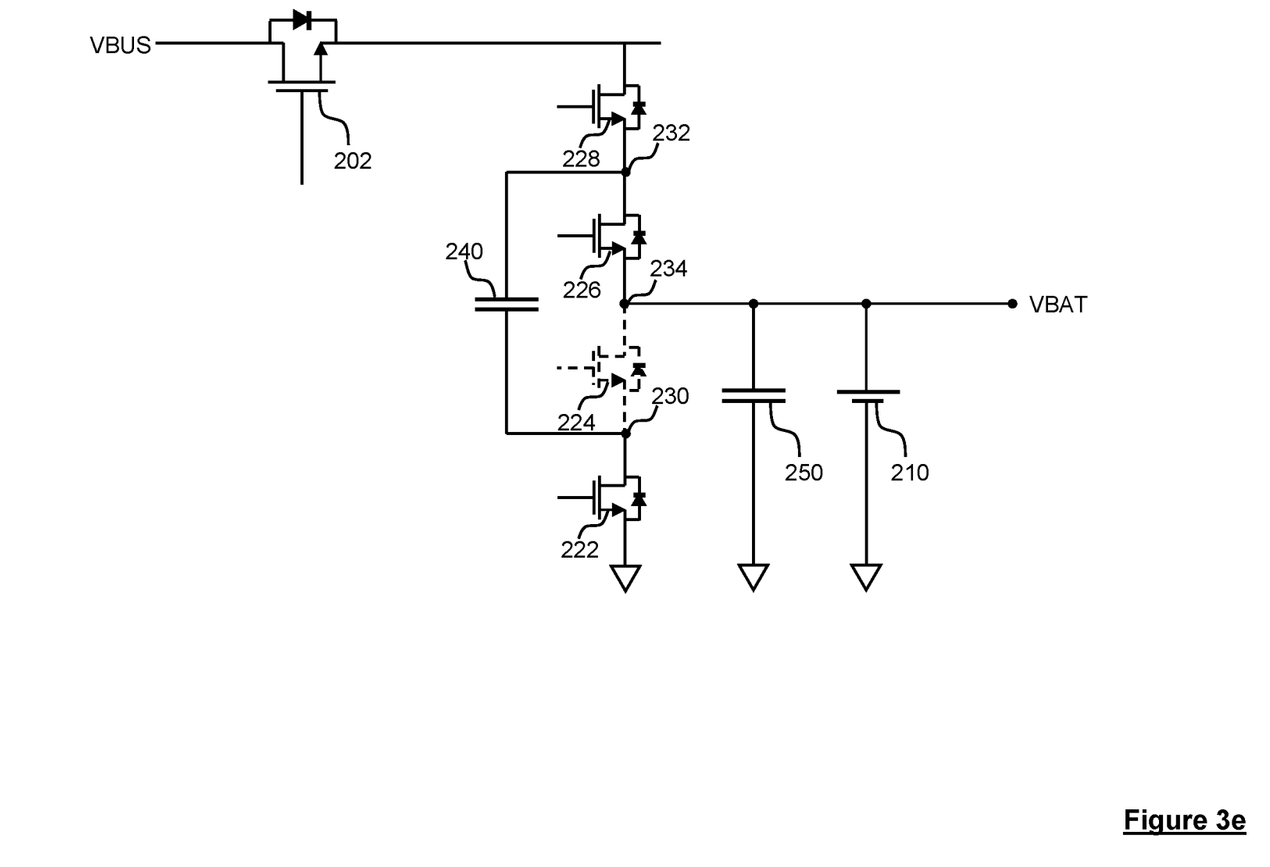

FIG. 3e shows a configuration of the switches 222-228 in a charging phase in the input undervoltage mode of operation. In this undervoltage mode charging phase configuration, the input switch 202 and the first, third and fourth switches 222, 226, 228 are turned on and the second switch 224 is turned off (and is thus shown in dashed outline in FIG. 3e), in response to suitable control signals output by the switch network control circuitry 300.

Thus, in the input undervoltage mode charging phase the flying capacitor 240 and the output capacitor 250 are coupled is coupled parallel between the input switch 202 and the ground (or other reference voltage) supply rail. The flying capacitor 240 and the output capacitor 250 therefore charge up to a voltage that is dependent upon the duration of the charging phase, which is in turn dependent upon the predefined undervoltage voltage mode charging threshold voltage Ref_UV_High. Thus, over the course of the charging phase, the flying capacitor 240 and the output capacitor 250 charge up to the undervoltage mode charging threshold voltage Ref_UV_High.

As described above with reference to FIG. 2, the switch network control circuitry 300 outputs suitable control signals to the switch network 220 to cause the switches 222-228 to adopt this input undervoltage mode charging phase configuration when the voltage VCFLY across the flying capacitor 240 is less than the predefined undervoltage mode charging threshold voltage Ref_UV_High. When the voltage CFLY reaches the predefined undervoltage mode charging threshold Ref_UV_High, the switch network control circuitry 300 outputs suitable control signals to the switch network 220 to cause the switches to adopt an input undervoltage mode discharge phase configuration.

Figure 3F:
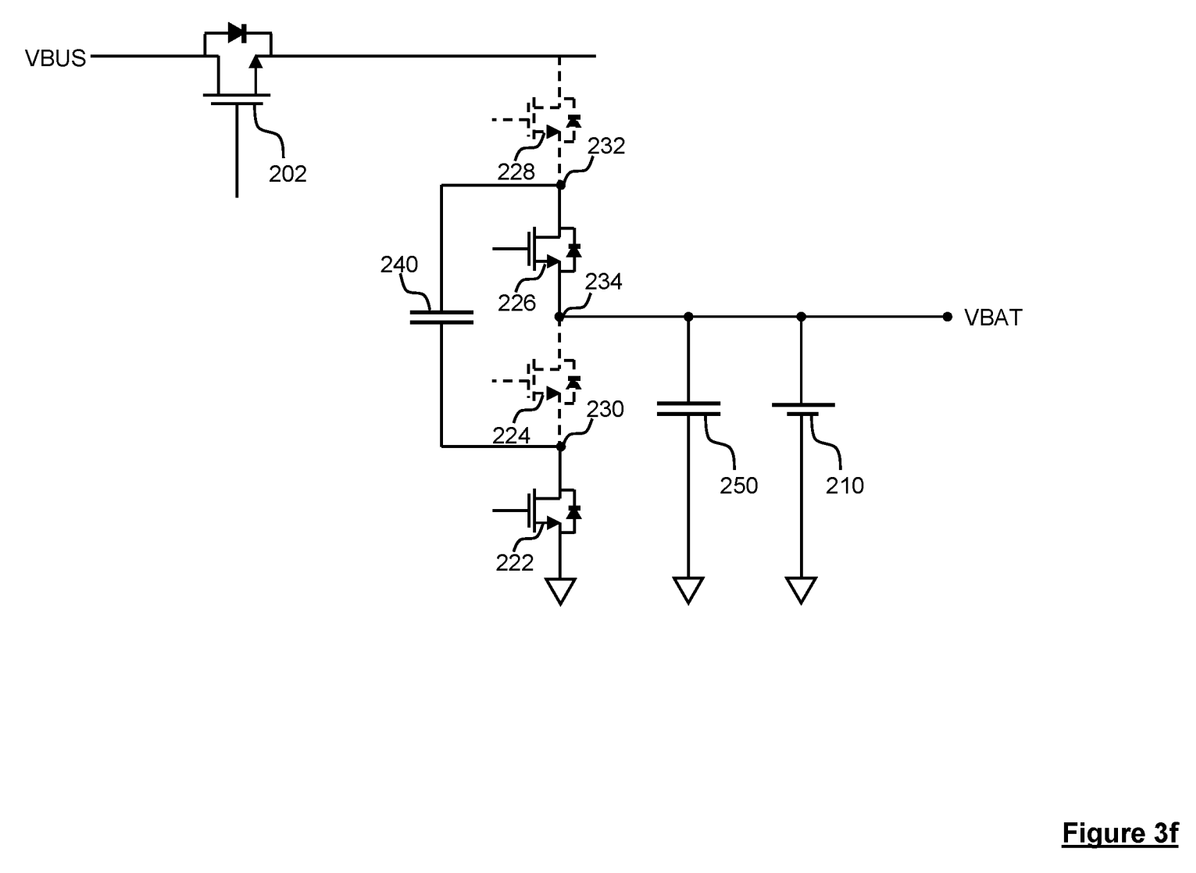

FIG. 3f shows a configuration of the switches 222-228 in a discharge phase in the input undervoltage mode of operation. In this discharge phase configuration, the first and third switches 222, 226 are turned on and the second and fourth switches 224, 228 are turned off (and are thus shown in dashed outline in FIG. 3f), in response to suitable control signals output by the switch network control circuitry 300.

Thus, in the discharge phase the flying capacitor 240 is coupled in parallel with the output capacitor 250 between the input switch 202 and the ground (or other reference voltage) supply rail. The flying capacitor 240 and the output capacitor 250 are therefore coupled in parallel. Over the course of the discharge phase, the flying capacitor 240 and the output capacitor 250 discharge such that the output voltage VBAT drops from the undervoltage mode discharging threshold voltage Ref_UV_LOW to the undervoltage mode charging threshold voltage Ref_UV_High.

As described above with reference to FIG. 2, the switch network control circuitry 300 outputs suitable control signals to the switch network 220 to cause the switches 222-228 to adopt this input undervoltage mode discharge phase configuration when the voltage VCFLY across the flying capacitor 240 is greater than the predefined undervoltage mode discharging threshold voltage Ref_UV_Low. When the voltage CFLY falls below the predefined undervoltage mode discharging threshold Ref_UV_Low, the switch network control circuitry 300 outputs suitable control signals to the switch network 220 to cause the switches to adopt the input undervoltage mode charging phase configuration shown in FIG. 3e.

The predefined undervoltage mode charging threshold voltage Ref_UV_High and the predefined undervoltage mode discharging threshold voltage Ref_UV_Low may be selected to ensure that during an undervoltage event the output voltage VBAT does not fall below a minimum input voltage required by the battery 210 (or other load) and does not exceed a safe input voltage for the battery 210 or other load. In some examples the undervoltage mode charging threshold voltage Ref_UV_High may be set to be equal to the input voltage VBUS, such that during the charging phase the flying capacitor 240 charges up to a voltage that is higher than would be reached in the normal mode of operation, because the input voltage VBUS during an overvoltage condition is higher than the input voltage during normal operation.

As will be appreciated, in the normal mode of operation of the switched capacitor power converter circuitry 200, the duty cycle of the switch network 220 is fixed, whereas in both the overvoltage mode and the undervoltage mode the duty cycle is variable, based on predefined flying capacitor charging and discharging thresholds, which define limits for the output voltage ripple. Thus, the switched capacitor power converter circuitry 200 is operable in a first mode in which the duty cycle of the switch network 220 is fixed and in a second mode in which the duty cycle of the switch network is variable.

The example switched capacitor power converter circuitry 200 described above with reference to FIG. 2 includes overvoltage mode control circuitry and undervoltage mode control circuitry. However, in other examples either the overvoltage mode control circuitry or the undervoltage mode control circuitry may be omitted.

As will be apparent from the foregoing description, the switched capacitor power converter circuitry 200 of the present disclosure has a control mechanism that enables the switched capacitor converter circuitry 200 to continue to supply the output voltage VBAT at a level that is not damaging to the battery 210 (or other load) even during input undervoltage or overvoltage events. Thus, unlike the switched capacitor power converter circuitry 100 of FIG. 1, the switched capacitor power converter circuitry 200 does not need LDO circuitry to regulate the input voltage.

Additionally, because of the configuration of the body diode of the input switch 202, the switched capacitor power converter circuitry 200 does not need to implement body diode control to prevent leakage from the battery 210 to the input, and so the switched capacitor power converter circuitry 200 is suitable for use at higher input voltages (e.g. greater than 5V) than the switched capacitor power converter circuitry 100 of FIG. 1.

The circuitry described above with reference to the accompanying drawings may be incorporated in a host device such as a laptop, notebook, netbook or tablet computer, a gaming device such as a games console or a controller for a games console, a virtual reality (VR) or augmented reality (AR) device, a mobile telephone, a portable audio player or some other portable device, or may be incorporated in an accessory device for use with a laptop, notebook, netbook or tablet computer, a gaming device, a VR or AR device, a mobile telephone, a portable audio player or other portable device.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. Switched capacitor power converter circuitry configured to receive an input voltage and to output an output voltage, the switched capacitor power converter circuitry comprising:
 a switch network;
 a flying capacitor coupled to the switch network; and
 an output capacitor coupled to an output node of the switch network,
 wherein the switched capacitor power converter circuitry is operable in:
  a first mode in which the switch network operates at a fixed duty cycle; and
  a second mode in which the switch network operates at a variable duty cycle based on
 a predetermined flying capacitor charging threshold and a predetermined flying capacitor discharging threshold.

2. The switched capacitor power converter circuitry according to claim 1, further comprising voltage monitor circuitry for monitoring a voltage across the flying capacitor.

3. The switched capacitor power converter circuitry according to claim 1, wherein the fixed duty cycle is 50%.

4. The switched capacitor power converter circuitry according to claim 1, wherein the switched capacitor power converter circuitry is operable in the second mode in response to an input overvoltage condition or an input undervoltage condition.

5. The switched capacitor power converter circuitry according to claim 1, further comprising overvoltage comparator circuitry configured to compare the input voltage to an overvoltage threshold voltage and to output a signal indicative of detection of an overvoltage condition if the input voltage exceeds the overvoltage threshold voltage.

6. The switched capacitor power converter circuitry according to claim 5, wherein the switched capacitor power converter circuitry is operative in an overvoltage control mode in response to detection of an overvoltage condition.

7. The switched capacitor power converter circuitry according to claim 6, wherein, in operation of the switched capacitor power converter circuitry in the overvoltage control mode, a duration of a charging phase of operation is defined by a first predetermined flying capacitor charging threshold and a duration of a discharging phase of operation is defined by a first predetermined flying capacitor discharging threshold.

8. The switched capacitor power converter circuitry according to claim 7, wherein:
 in the charging phase of operation, the flying capacitor and the output capacitor are coupled in series and the flying capacitor receives the input voltage so as to charge up to the first predetermined flying capacitor charging threshold; and
 in the discharging phase of operation, the flying capacitor and the output capacitor are coupled in parallel and the flying capacitor discharges to the first predetermined flying capacitor discharging threshold.

9. The switched capacitor power converter circuitry according to claim 1, further comprising undervoltage comparator circuitry configured to compare the input voltage to an undervoltage threshold voltage and to output a signal indicative of detection of an undervoltage condition if the input voltage falls below the undervoltage threshold voltage.

10. The switched capacitor power converter circuitry according to claim 9, wherein the switched capacitor power converter circuitry is operative in an undervoltage control mode in response to detection of an undervoltage condition.

11. The switched capacitor power converter circuitry according to claim 10, wherein, in operation of the switched capacitor power converter circuitry in the undervoltage control mode, a duration of a charging phase of operation is defined by a second predetermined flying capacitor charging threshold and a duration of a discharging phase of operation is defined by a second predetermined flying capacitor discharging threshold.

12. The switched capacitor power converter circuitry according to claim 11, wherein:
 in the charging phase of operation, the flying capacitor and the output capacitor are coupled in parallel and each receive the input voltage so as to charge up to the second predetermined flying capacitor charging threshold; and
 in the discharging phase of operation, the flying capacitor and the output capacitor are coupled in parallel and the flying capacitor discharges to the second predetermined flying capacitor discharging threshold.

13. The switched capacitor power converter circuitry according to claim 1, wherein the switch network comprises first to fourth switches coupled between an input and a reference voltage supply rail, wherein a first terminal of the flying capacitor is coupled to a node between the first and second switches and a second terminal of the flying capacitor is coupled to a node between the third and fourth switches.

14. The switched capacitor power converter circuitry according to claim 1, further comprising an input switch having a body diode configured to block current flow in a direction from the output node of the switch network to an input voltage supply which supplies the input voltage.

15. Battery charger circuitry comprising the switched capacitor power converter circuitry according to claim 1.

16. An integrated circuit comprising the switched capacitor power converter circuitry according to claim 1.

17. A host device comprising the switched capacitor power converter circuitry according to claim 1.

18. The host device according to claim 17, wherein the host device comprises a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console a VR or AR device, a mobile telephone, a portable audio player or other portable device.

19. Switched capacitor power converter circuitry comprising:
 a switch network; and
 a flying capacitor coupled to the switch network; and
 an output capacitor coupled to an output node of the switch network,
 wherein the switched capacitor power converter circuitry is operable in:

a first mode in which:
    during a charging phase of operation, the switch network adopts a configuration in which the flying capacitor and the output capacitor are coupled in series and the flying capacitor is coupled to an input voltage node; and
    during a discharging phase of operation, the switch network adopts a configuration in which the flying capacitor and the output capacitor are coupled in parallel; and
a second mode in which:
    during a charging phase of operation, the switch network adopts a configuration in which the flying capacitor and the output capacitor are coupled in parallel and the flying capacitor and the output capacitor are both coupled to the input voltage node; and
    during a discharging phase of operation, the switch network adopts a configuration in which the flying capacitor and the output capacitor are coupled in parallel.

20. Switched capacitor power converter circuitry comprising:
    a switch network configured to receive an input voltage;
    a flying capacitor coupled to an output of the switch network; and
    mode control circuitry configured to control operation of the switched capacitor power converter circuitry based on the input voltage, such that:
        the switched capacitor power converter circuitry operates in an overvoltage mode in which a duty cycle is dependent upon first predefined output ripple voltage limits in the event of an input overvoltage condition;
        the switched capacitor power converter circuitry operates in an undervoltage mode in which the duty cycle is dependent upon second predefined output ripple voltage limits in the event of an input undervoltage condition; and
        the switched capacitor power converter circuitry operates in a normal mode with a fixed duty cycle in the absence of the input overvoltage or input undervoltage condition.

* * * * *